Aug. 12, 1941.  A. G. MacINTYRE  2,252,298
FOOD PACKAGE
Filed Dec. 2, 1938   2 Sheets-Sheet 1
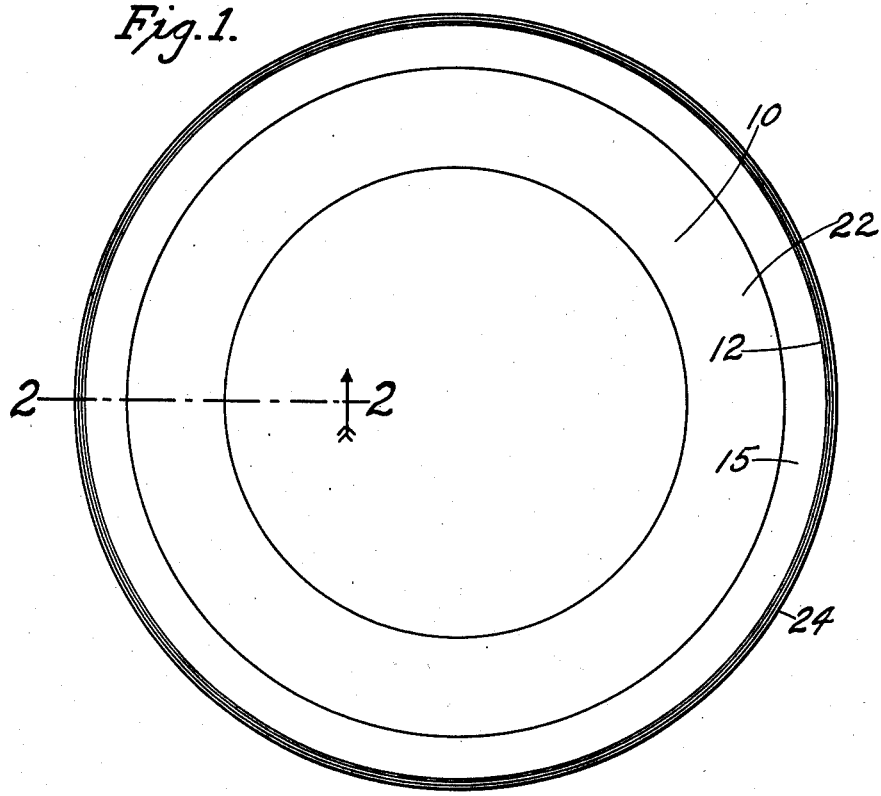
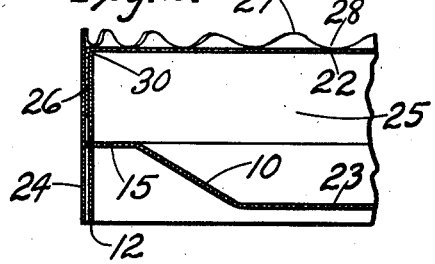
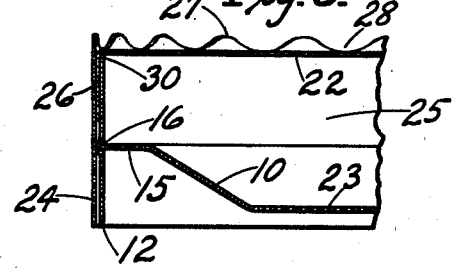
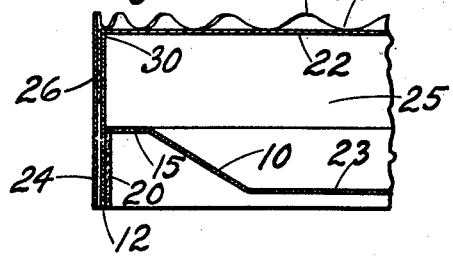
INVENTOR.
Aimwell G. MacIntyre
BY Frederick W. Cotterman
ATTORNEY.

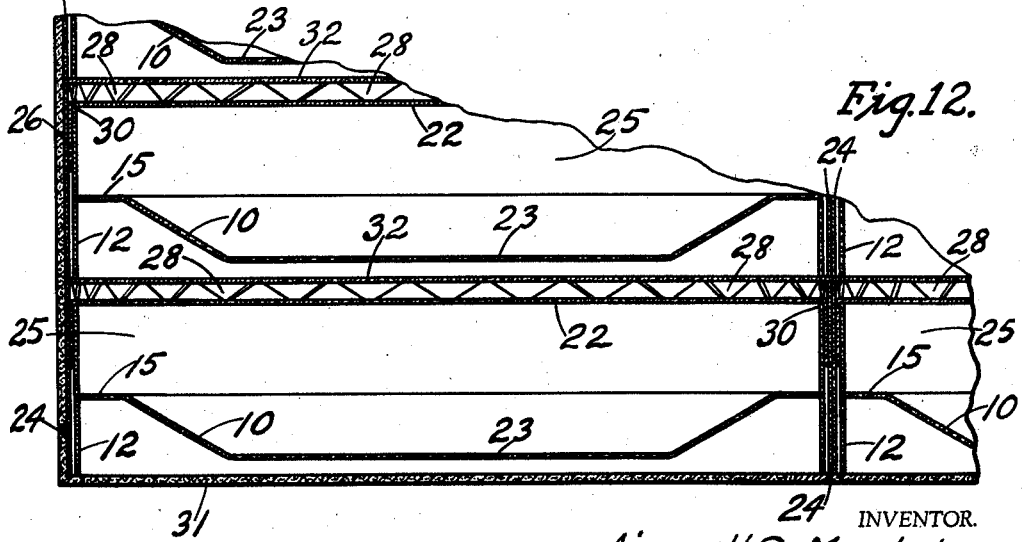

Patented Aug. 12, 1941

2,252,298

UNITED STATES PATENT OFFICE 2,252,298

FOOD PACKAGE

Aimwell G. MacIntyre, Franklin, Ohio, assignor to Jay M. Leach, Dayton, Ohio

Application December 2, 1938, Serial No. 243,603

2 Claims. (Cl. 206—44)

This invention relates to packages for food especially baked goods such as pies, cakes, etc., and more particularly to that type of closed and sealed package in which the contents are visible.

Due to the increasing popularity of pies having a high top coating of fluff, there is an increasing need for containers having more depth in the package between the transparent top cover and the pan, and it is therefore one object of this invention to provide a package wherein the pan and the cover are spaced rather widely apart, together with means to positively hold these members so spaced.

Baked goods which are put up in packages of this class are generally delivered in considerable quantity, and, to carry out this purpose, the packages are usually stacked in a crate or other container in several layers, one layer over the other, with the heavy sheet of paper between the layers. When this is done, as it usually is, while the pies or cakes are still quite hot, a sweating or steaming action takes place because the heat is too effectively confined in each individual container by the heavy sheets of paper, whereby the contents tend to become soggy sooner than they otherwise would.

It is therefore another object of this invention to provide a package of this general class with means for separately ventilating each individual package of all the layers of a crate or carton without detracting from its effectiveness as a single container.

Another object is to provide a container with the aforesaid ventilating means without adding to its cost or detracting from its appearance, such means rather rendering the container more artistic and attractive, thereby increasing the sales appeal.

Other objects and advantages will become self evident from a consideration of the following description when read with reference to the accompanying drawings, wherein, Fig. 1 is a top plan view of a single package.

Figs. 2 to 4 are several vertical fragmentary sections taken as of 2—2 of Fig. 1 showing several ways in which the pan may be supported in the band.

Figs. 5 to 8 show in detail the several modifications of the inner band as used in the complete structure Figs. 2 to 4.

Figs. 9 to 11 show several variations of the ventilating openings which are a feature of the package.

Fig. 12 is a fragment of a crate showing how the packages are stacked in several layers.

Construction

Referring now particularly to the drawings, the package comprises a pie pan 10 which in the embodiment shown is of circular form and made of heat resisting paper or similar fibrous material such as is now being used extensively in commercial practice in the baking industry. These pans are made to serve alike as a receptacle in which the pie is baked and as a container in which it is marketed.

To form a package around the pan 10, an inner round band 12 is preferably first provided by bending a strip 14, Fig. 5, of heavy paper to circular form with the ends of the strip overlapping, bringing it to the correct diameter, and glueing, stapling, or otherwise securing the overlapped ends. The strip is additionally provided with a means for holding the pan supported by its outer rim 15. Such means may either comprise a shallow groove 16, shown in detail in an end view of a strip Fig. 7, into which the rim 15 of the pan may be sprung, or it may comprise a series of slits 18, cut through the strip at spaced intervals throughout its length as shown in detail in the elevation Fig. 5 and end view Fig. 6, such slits in the completed ring being positioned at circumferentially spaced intervals around the ring and adapted to receive corresponding portions of the rim 15, or again it may comprise a relatively narrow band 20, Fig. 4 or 8, of card board or similar material, enough smaller in external diameter than the band 12 to fit within it, the two bands being stapled or otherwise secured together, thereby leaving a ledge for the rim 15 to rest upon.

As a top closure for the package, a circular disc 22 of transparent material, which may be of Cellophane or the like, and of a diameter larger than the band 12 is laid on top of the band with the edges extending therebeyond, and an outer band 24 is then pressed downwardly over the inner band 12 with the extending edges of the disc drawn to cylindrical form between the two bands as at 26 which makes a sufficiently tight seal.

It should be noted that, in packages of this class as heretofore marketed, the transparent top cover 22 is drawn closely over the rim 15 of the pan leaving very little space for the high fluff tops provided on many present day pies. In the present invention, the pan is so supported as to bring its bottom 23 near the lower edge of the band 12 and the transparent top cover 22 is drawn over the top edge of the band leaving a wide space 25 for the highly decorative top dressings of the pies.

The edge of the outer band 24 may be crenate as at 27, Fig. 9, serrated as at 29, Fig. 10, notched as at 31, Fig. 11, or otherwise provided on at least one of its edges with ventilating inflections 28 which should extend far enough beyond a straight edge 30 of the inner band 12 as not to be closed thereby.

By making the outer band 24 as much wider than the inner band 12 as the vertical height of the ventilating inflections 28, the ventilators in the completed package will be positioned above the transparent top 22. When, therefore, a number of packages containing hot pies are packed in a carton or crate 31 as shown in Fig. 12 there is opportunity for free circulation of air between the packages of an entire layer, the air passing through the inflections 28 of the outer bands, and through the space left in each individual package between the top cover 22 and the sheets of paper 32 separating the layers.

While the embodiment of the invention hereinbefore described attains the several objects enumerated, obviously many modifications of the structure will come within the scope of the invention as defined in the appended claims.

The lower edges of the bands, for instance, could be notched instead of or in addition to the notches shown, to provide ventilation, although more effective ventilation and greater ornamentation is achieved in the structure shown. Obviously, for sanitary reasons, no ventilating openings should extend through the outer wall between the points of support of the pan and cover.

I claim:

1. A food display package comprising, an inner supporting band, a pan supported intermediate the top and bottom edges of said band, a transparent cover disc resting on the top edge of said band, its outer edge formed cylindrically around the outside of said band, an outer band having a width exceeding the inner band surrounding said cylindrically formed portion closely and having its excess width extending vertically above said cover and provided with a series of ventilating inflections in the upper edge of the extending portion, whereby a rigid support is provided for stacking a plurality of the packages and ventilation is maintained for the under packages.

2. A food delivery package comprising, a crate or carton, several layers of packages made according to claim 1, and a sheet of paper between adjacent layers resting on the upper edge of the outer ring on points intermediate the said inflections.

AIMWELL G. MacINTYRE.